(12) United States Patent
Mason

(10) Patent No.: US 10,663,000 B2
(45) Date of Patent: May 26, 2020

(54) DIRECT DRUM BUSHING

(71) Applicant: SUPERIOR TRANSMISSION PARTS, INC., Tallahassee, FL (US)

(72) Inventor: Dean Mason, Tallahassee, FL (US)

(73) Assignee: SUPERIOR TRANSMISSION PARTS, INC., Tallahassee, FL (US)

( * ) Notice: Subject to any disclaimer, the term of this patent is extended or adjusted under 35 U.S.C. 154(b) by 0 days.

(21) Appl. No.: 16/163,104

(22) Filed: Oct. 17, 2018

(65) Prior Publication Data

US 2019/0113075 A1  Apr. 18, 2019

Related U.S. Application Data

(60) Provisional application No. 62/573,831, filed on Oct. 18, 2017.

(51) Int. Cl.
| | |
|---|---|
| *F16C 33/10* | (2006.01) |
| *F16D 13/74* | (2006.01) |
| *F16D 13/10* | (2006.01) |
| *F16D 13/68* | (2006.01) |

(52) U.S. Cl.
CPC ........ *F16C 33/1065* (2013.01); *F16C 33/103* (2013.01); *F16C 33/107* (2013.01); *F16D 13/10* (2013.01); *F16D 13/683* (2013.01); *F16D 13/74* (2013.01); *F16C 2361/43* (2013.01)

(58) Field of Classification Search
CPC ........ F16C 17/02; F16C 33/10; F16C 33/103; F16C 33/1065; F16C 33/107; F16C 33/1085
See application file for complete search history.

(56) References Cited

U.S. PATENT DOCUMENTS

| | | | |
|---|---|---|---|
| 6,729,763 B2* | 5/2004 | Post | F16C 23/045 384/213 |
| 9,140,302 B2* | 9/2015 | Kane | F16C 33/1095 |
| 2008/0112658 A1* | 5/2008 | Justin | F16C 17/02 384/107 |
| 2018/0187765 A1* | 7/2018 | Narayan | F16H 51/00 |

* cited by examiner

*Primary Examiner* — James Pilkington
(74) *Attorney, Agent, or Firm* — Dowell & Dowell, P.C.

(57) ABSTRACT

An improved bushing restricts exhaust at a lube transfer port and exhaust ports equalizing bushing lube PSI with lube supply PSI. A hole or pair of holes in the bushing with an area equal to that of the lube supply holes in a center support regulates an intermediate pressure to the bushings of 50% of the supply pressure on its own, regardless of the balance piston. When the balance piston is filled, the added resistance at the transfer orifices will begin to equalize bushing lube PSI with lube supply PSI. When the balance piston exhaust ports are also restricted, as with an increased height of the bushing and installation site, equalization is insured and bushing lube PSI becomes that of the supply PSI.

16 Claims, 9 Drawing Sheets

DIRECT DRUM BUSHING

CROSS-REFERENCE TO RELATED APPLICATIONS

The present application claims the benefit of U.S. provisional application No. 62/573,831, filed on Oct. 18, 2017.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates to the field of automotive transmissions, and more specifically to an improved bushing for use in a direct clutch drum of a transmission.

Several figures are provided to illustrate the factory-standard structure and corresponding function of the direct clutch drum and bushing to better understand the benefits provided by the present invention. FIG. 1 illustrates an assembly of a center support 100, a direct clutch drum 102, and a forward clutch drum 104 of a Ford 5R110W automatic transmission (hereinafter, the "Ford transmission").

FIG. 2 illustrates the structure of the factory-standard, or OEM (original equipment manufacturer), direct clutch drum 102, which employs an OEM bushing 110 within a center cylindrical opening 105 of the direct clutch drum to engage a lube supply 114 of the center support 100. The OEM bushing 110 includes two cylindrical bushings 112 vertically spaced within the center cylindrical opening 105 of the direct clutch drum 102. A center cylinder 107 of the direct clutch drum, defining the center cylindrical opening 105, has two transfer ports 108 located 180° degrees apart. These two drum transfer ports 108 match two lube supply holes 109 located on the lube supply 114 of the center support 100. Several balance piston exhaust ports 106 are spaced around an upper edge of the center cylinder 107.

FIG. 3 illustrates the OEM bushing 110, wherein two narrow cylindrical bushings 112 together comprise the OEM bushing 110. The OEM bushing 110 is sized in diameter to fit within the center cylindrical opening 105 of the center cylinder 107.

FIG. 4 illustrates the center support 100, and namely how the each cylindrical bushing 112 of the OEM bushing 110 would interact with the lube supply 114 in operation.

In regards to the Ford transmission, the size of the two drum transfer ports 108 and two supply transfer ports 109 are important to the operation of a drum bushing. The two transfer ports 108 are each sized as 0.200 in (inches) or 5.080 mm (millimeters) in diameter, and have a combined area represented by a 0.283 in or 7.188 mm diameter hole. The two supply transfer ports 109 are each sized as 0.082-0.084 in or 2.083-2.134 mm in diameter, and have a combined area equal to a 0.118 in or 2.997 mm diameter hole. A 0.118 in or 2.997 mm feed with a 0.283 in or 7.188 mm leak (5.67:1 leak to supply area ratio) yields minimal physical restriction and near zero PSI (pounds per square inch), or kPa (kilopascals), in the bushing area, as all flow is dumped to the balance piston through the drum transfer holes. Since the balance piston exhaust ports have a combined area more than double that of the transfer ports, the only pressure generated between the drum bushings is that necessary to push the volume of lube supply out of the vent path.

Although this configuration will keep the bushing area generally charged with lube, it is less than adequate to pump sufficient amounts of lube across the bearing surface of the bushings. This is evidenced by the shortened life and visible bluing of the two narrow bushings. Bluing, or discoloration from heat tempering, is proof of excess friction. This occurs when there is inadequate lube applied to the bearing surface. Conversely, when a bushing surface is adequately lubed it will effectively hydroplane across the supporting surface. The present invention seeks to induce an effect similar to hydroplaning between an improved bushing and supporting surface. Further discussion of the invention is provided in drawings and a detailed description of the invention.

BRIEF DISCUSSION OF THE PRIOR ART

Known after-market bushings have been designed for the Ford transmission in an attempt to increase lubrication, decrease friction, and improve overall performance. FIGS. 5-6 illustrate one such example of an after-market bushing for the Ford transmission direct clutch drum.

FIG. 5 depicts an after-market bushing 210 inserted into the center cylindrical opening 105 of the center cylinder 107 of the direct clutch drum 102. The large openings of the two drum transfer ports 214 of the after-market bushing 210 match the drum transfer ports 108 of the direct clutch drum and therefore do not alter pressure or significantly improve lubrication of the bushing. FIG. 6 illustrates the after-market bushing 210 as depicted in FIG. 5, which includes a single wide cylinder 212 made out of bronze with two drum transfer ports 214 positioned 180 degrees apart to correspond and match the two drum transfer ports 108 and two lube supply holes 109 of the direct clutch drum 102 and center support 100.

BRIEF SUMMARY OF THE INVENTION

The present invention solves the problem of inadequate lubrication between a center support and direct clutch drum of a transmission by providing an improved cylindrical bushing with multiple channels along an inner service, said multiple channels including at least one central channel oriented in a circumferential manner and at least one channel oriented perpendicularly to the central channel along the height of the bushing, the cylindrical bushing further having one or more openings in the central channel to improve lubrication pressure.

In a preferred embodiment of the improved bushing, the bushing comprises a cylindrical sleeve having an outer surface and inner surface, wherein the outer surface of the cylindrical sleeve is securable to an inner surface of a direct clutch drum cylinder, a central channel extending circumferentially along the inner surface, a lube transfer port located along the central channel and through which a lubricant can pass, and four vertical lube channels extending along the inner surface, the four vertical lube channels each passing perpendicularly through the central channel and each of the four vertical lube channels being spaced at least 90 degrees apart from each of the other four vertical lube channels along the inner surface, wherein an end of each of the four vertical lube channels does not extend to an edge of the inner surface.

A better understanding of the present invention, including the preferred embodiment and further embodiments, will be had when referencing the follows drawings.

BRIEF DESCRIPTION OF THE SEVERAL VIEWS OF THE DRAWING

The present invention is shown and described in the following drawings.

DETAILED DESCRIPTION OF THE INVENTION

Figure 1:
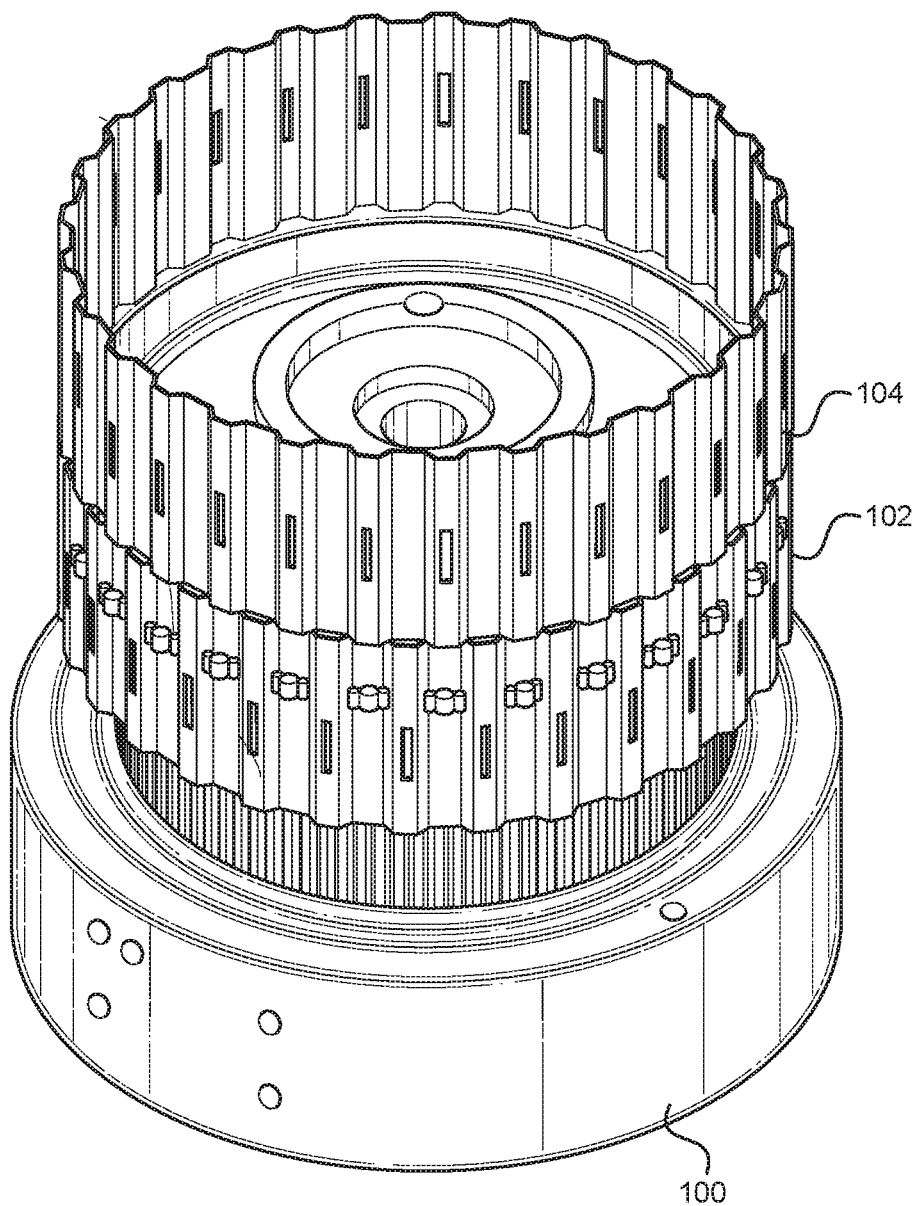
FIG. 1 illustrates a side perspective view of an OEM center support, an OEM direct clutch drum, and an OEM forward clutch drum assembled together.
Figure 2:
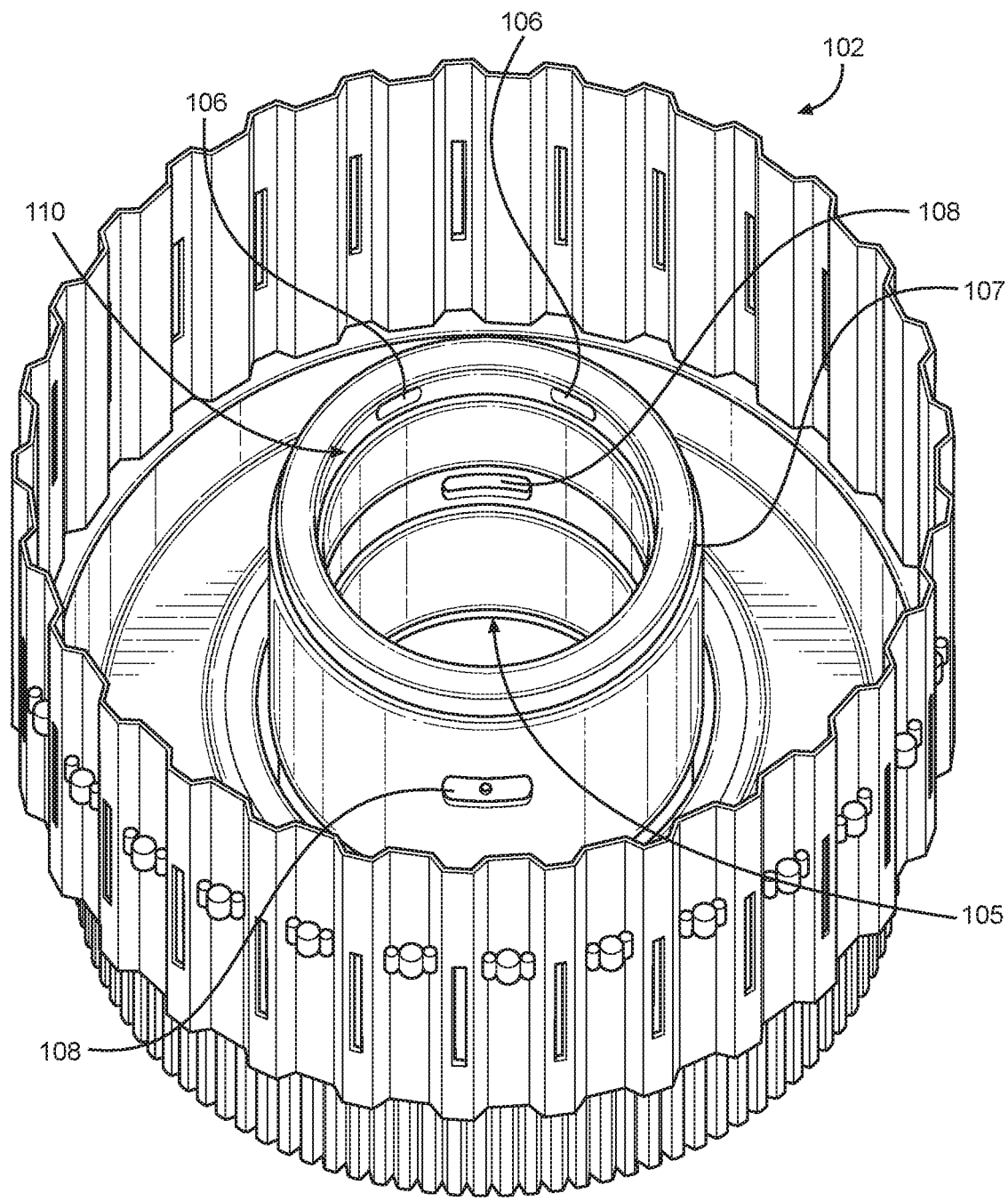
FIG. 2 illustrates a top perspective view of the OEM direct clutch drum with an OEM bushing installed.
Figure 3:
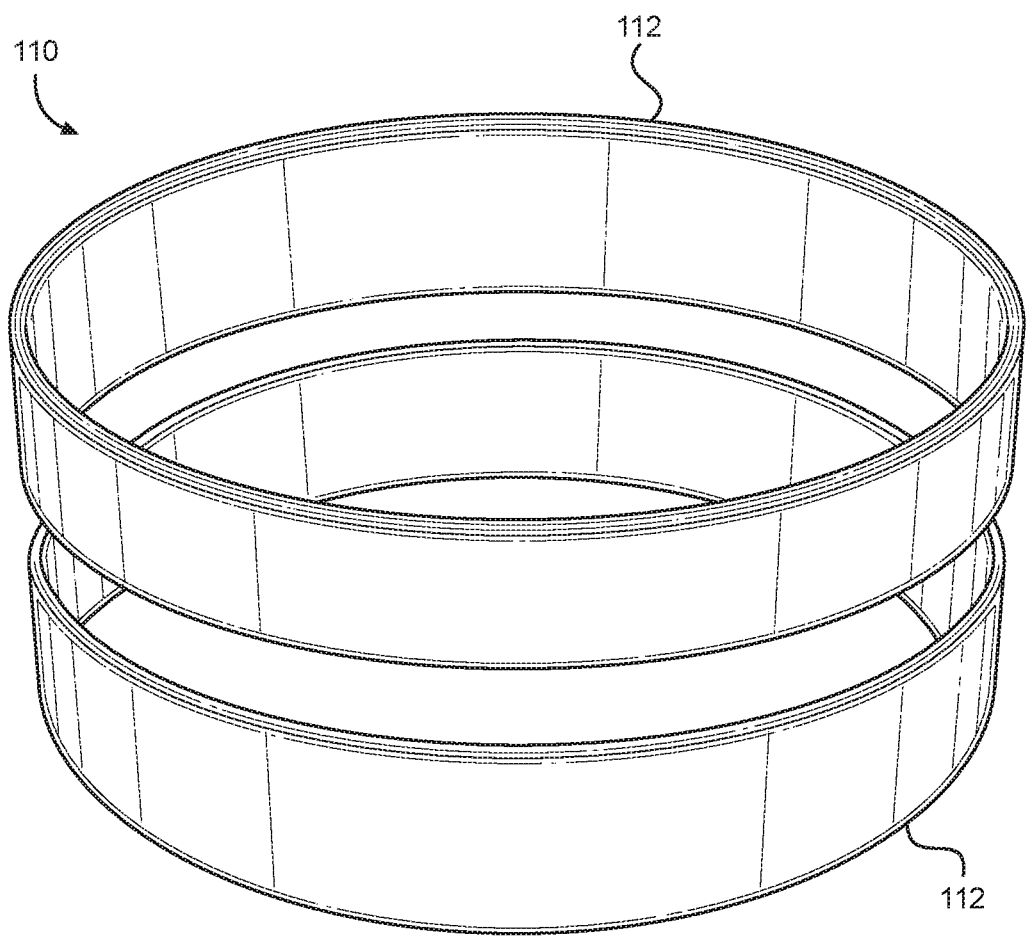
FIG. 3 illustrates a side perspective view of the OEM bushing of the OEM direct clutch drum, as shown in FIG. 2.
Figure 4:
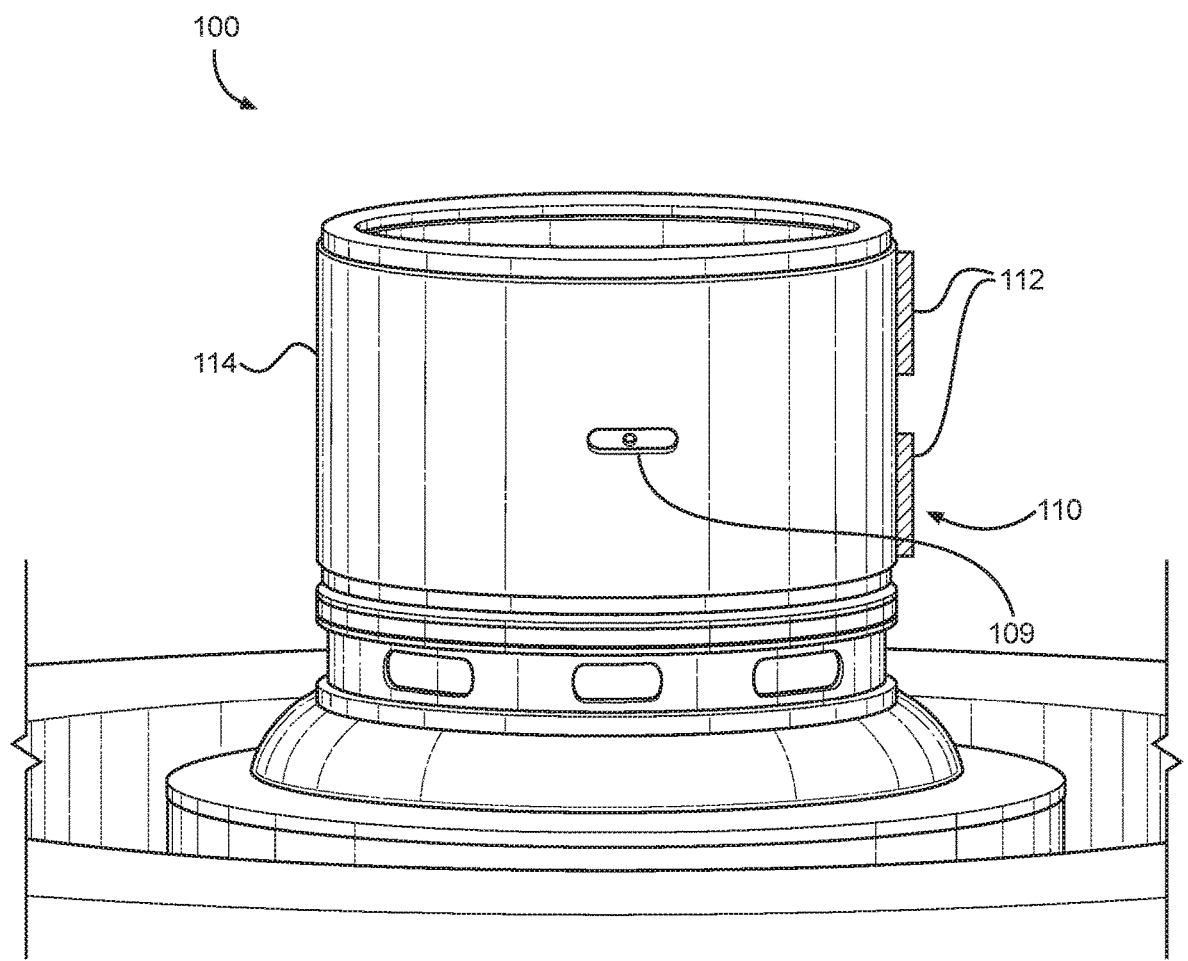
FIG. 4 illustrates a side perspective view of the OEM center support and positioning of the OEM bushing when the OEM direct clutch drum is assembled with the OEM center support.
Figure 5:
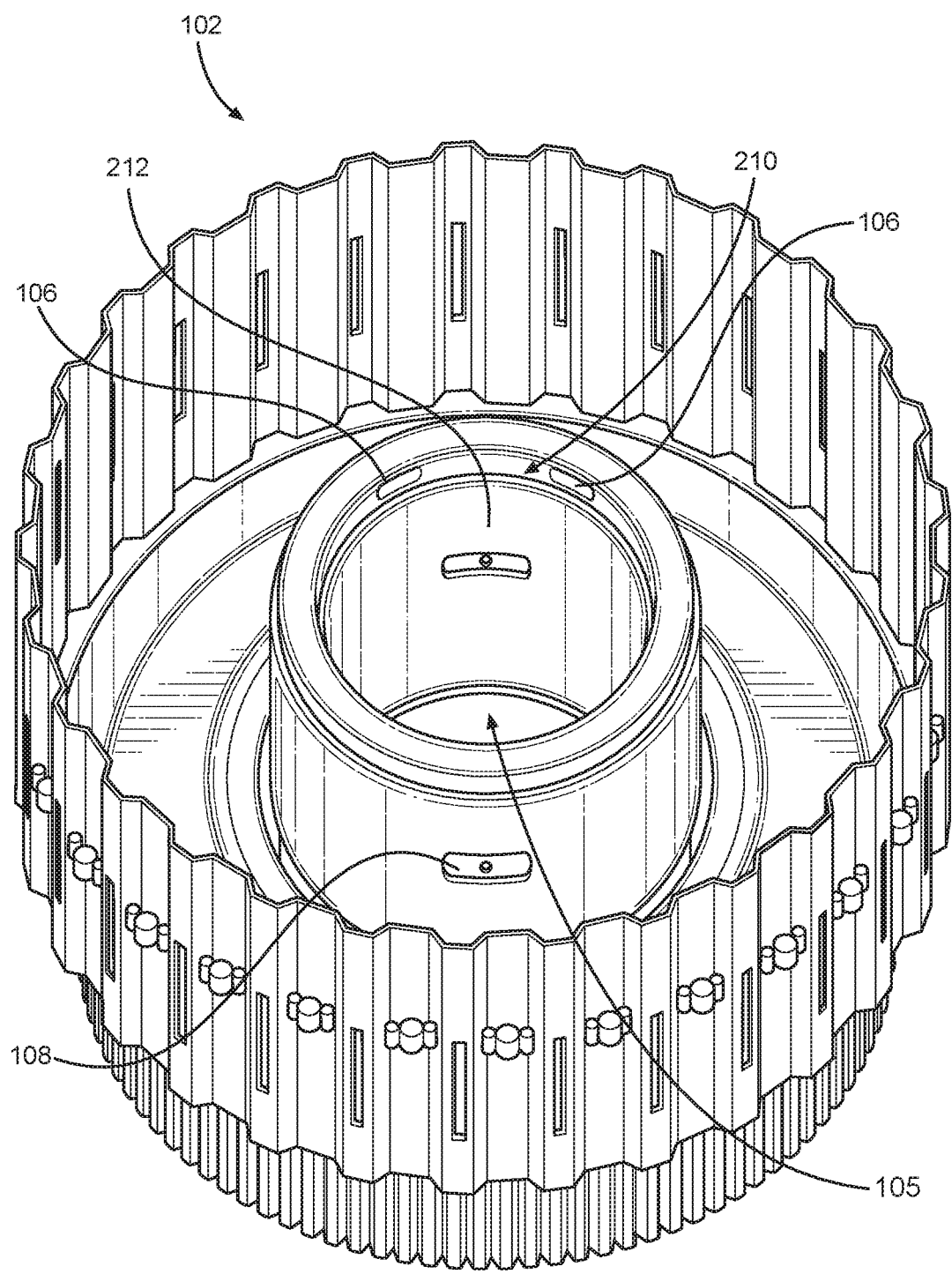
FIG. 5 illustrates a top perspective view of the OEM direct clutch drum with an after-market prior art bushing installed to replace the OEM bushing.
Figure 6:
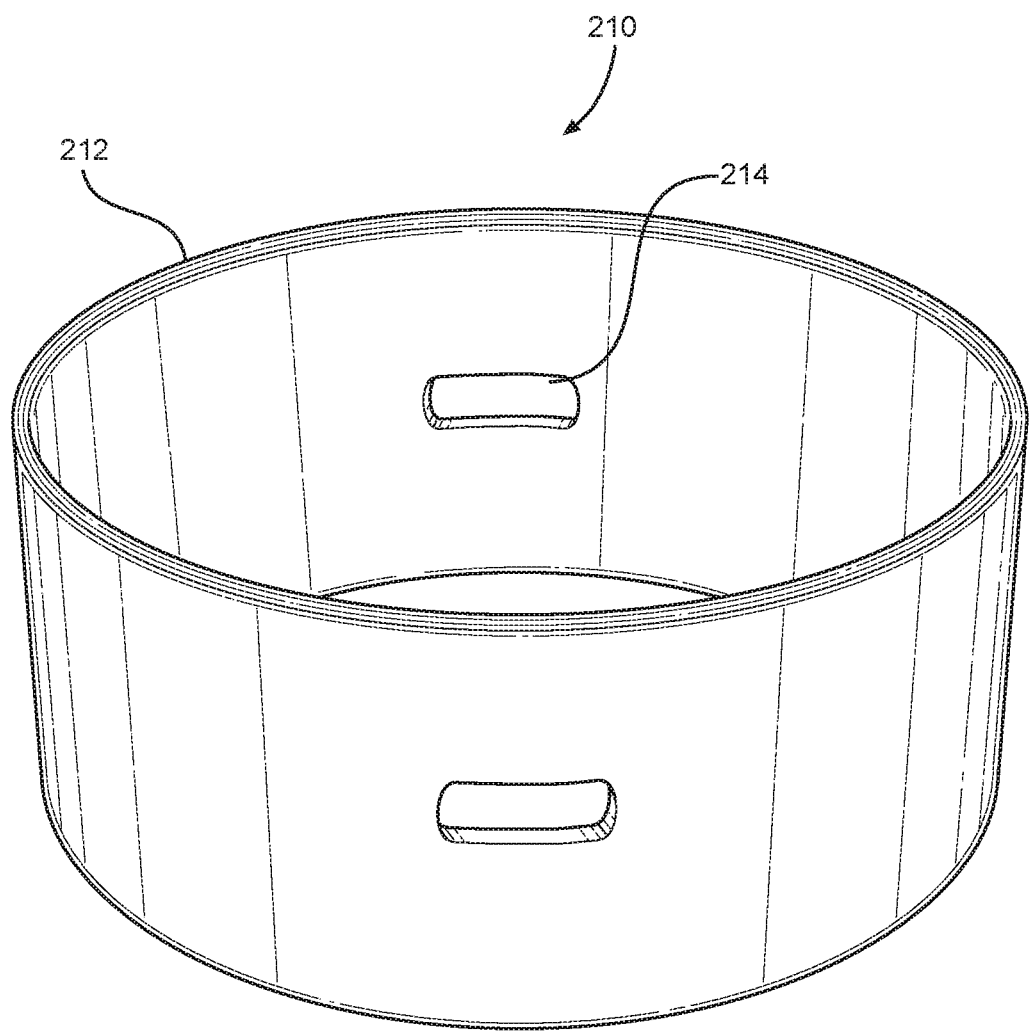
FIG. 6 illustrates a side perspective view of the after-market prior art bushing installed in the OEM direct clutch drum, as shown in FIG. 5.
Figure 7:
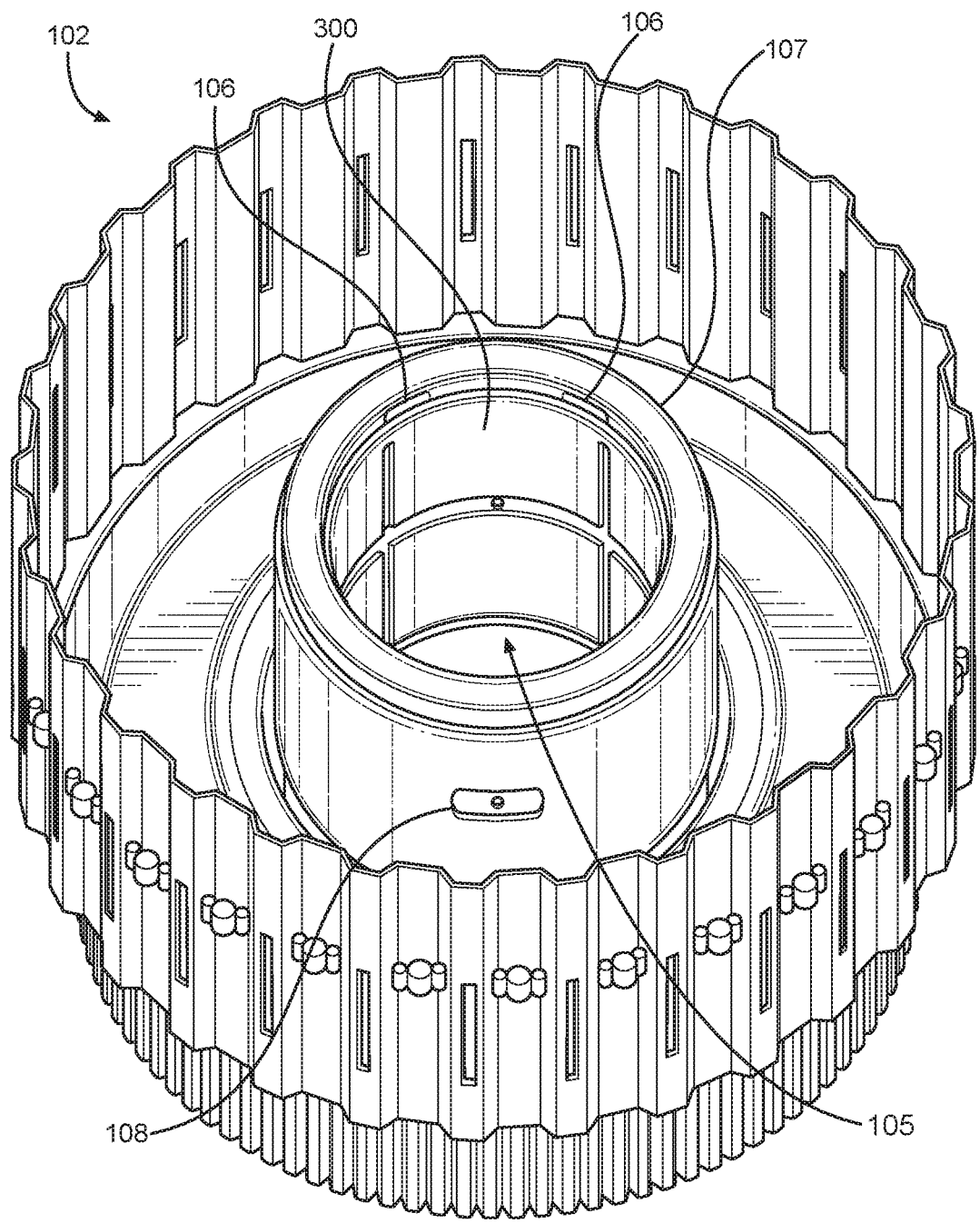
FIG. 7 illustrates a top perspective view of the OEM direct clutch drum with a preferred embodiment of the presently disclosed improved bushing installed therein.

With reference to FIG. 7, a preferred embodiment of an improved bushing 300 is shown installed within an OEM direct clutch drum 102. The bushing 300 is installed within the center cylindrical opening 105 along an inner surface of the center cylinder 107 to a depth of 0.125 in or 3.175 mm (+/−0.005 in or 0.127 mm) below flush to a washer surface of the direct clutch drum 102. The bushing 300 can also be installed alongside a spacer ring with a height of 0.125 in or 3.175 mm to achieve the same positioning within a center cylinder 107 of the direct clutch drum 102. This position restricts exhaust through the balance piston exhaust ports 106 to assist with equalizing bushing lube and supply PSI or kPa.

Figure 8:
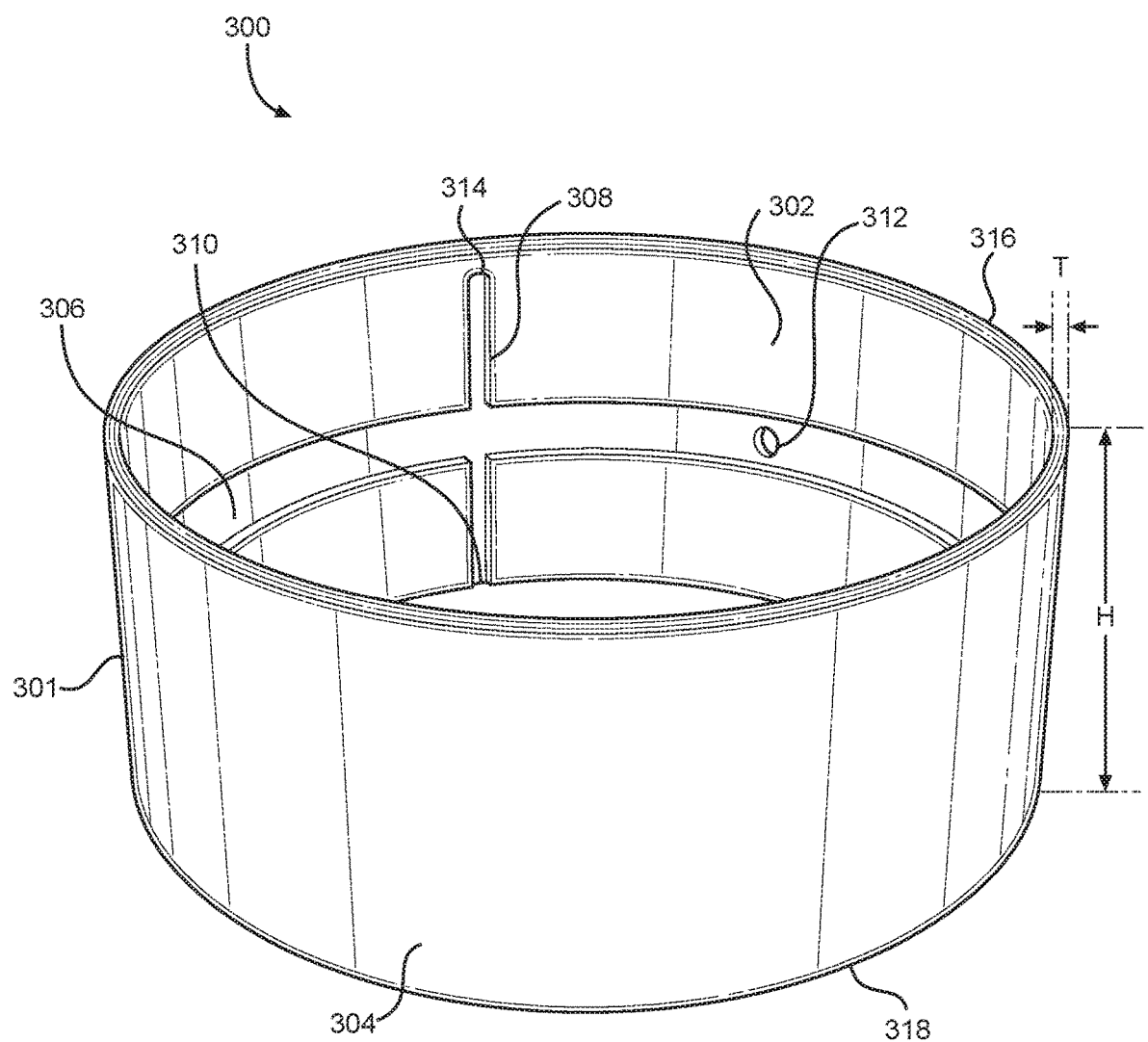
FIG. 8 illustrates a side perspective view of a preferred embodiment of a direct drum bushing, as shown in FIG. 7.

With reference to FIG. 8, a side perspective view of a preferred embodiment of the improved bushing 300 is shown. The bushing 300 includes a cylindrical sleeve 301 having an inner surface 302, an outer surface 304, a thickness T, and a height H. The thickness T of the sleeve 301 tapers slightly along the top edge 316 and bottom edge 318. Additional embodiments of the bushing do not have a tapered top edge and/or a tapered bottom edge. The outer surface 304 of the bushing 300 rests along the inner surface of the center cylinder 107 of the direct clutch drum 102 when installed for use. The inner surface of the bushing 300 rests along the lube supply 114 of the center support 100 when installed for use. Along the inner surface 302, a central channel 306 is formed into the thickness T of the sleeve 301 along a circumference of the sleeve. At least one vertical channel 308 is formed along the inner surface 302 into the thickness T of the sleeve 301, wherein the length of each vertical channel extends along the height H of the sleeve 301. Each vertical channel 308 intersects the central channel 306 perpendicularly. In the preferred embodiment, four vertical channels 308 are evenly spaced along the inner surface 302 of the sleeve 301, and each vertical channel has a closed end 314 and an open end 310. Each closed end 314 of each vertical channel 308 is located near a top edge 316 of the sleeve 301 and each open end 310 is located along a bottom edge 318 of the sleeve. At least one lube transfer port 312 is located within the central channel 306 and bisecting the thickness (T) of the sleeve 301. The lube transfer port 312 allows lubricant to pass between the lube supply 114 of the center support 100 and center cylinder 107 of the direct clutch drum 102.

Figure 9:
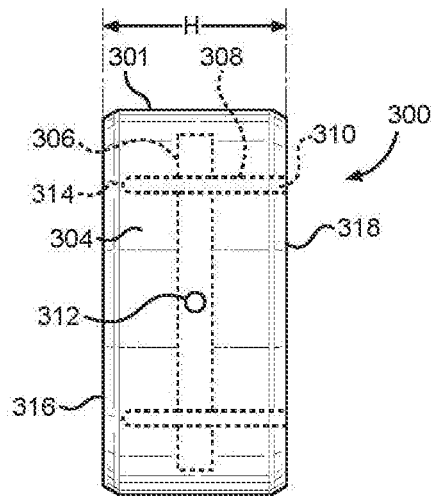
FIG. 9 illustrates a side view of the preferred embodiment of the direct drum bushing.

FIGS. 9-13 provide further views of the preferred embodiment of the bushing 300. The side view of FIG. 9 shows the lube transfer port 312 positioned within the central channel 306 and between two vertical channels 308. In the preferred embodiment, only one lube transfer port is present. However, two lube transfer ports are contemplated in a further embodiment, with each of the two lube transfer ports positioned 180° degrees from each other within the central channel 306. In such an embodiment, the side view illustrated in FIG. 9 would be mirrored from the opposite side of the bushing. The lube transfer hole 312 in the preferred embodiment is 0.093 in or 2.362 mm in diameter, but may range in diameter in other embodiments between 0.062-0.187 in or 1.575-4.750 mm, inclusive. All diameters within said range are smaller than the OEM lube transfer port diameter of 0.200 in or 5.080 mm. Reducing the diameter of the lube transfer port restricts lubricant flow to the balance piston, thereby increasing PSI or kPa in the bushing lube region above near zero to increase lubricant flow.

In the preferred embodiment, the height H of the sleeve 301 is 1.46 in or 37.084 mm. All known prior art, single piece bushings have a height slightly larger than the OEM bushing, but no larger than 1.26 in or 32.004 mm. All contemplated embodiments of the present invention have heights H greater than 1.30 in or 33.020 mm, as such heights minimize drum rocking, which occurs with an axial misalignment off the centerline.

Figure 10:
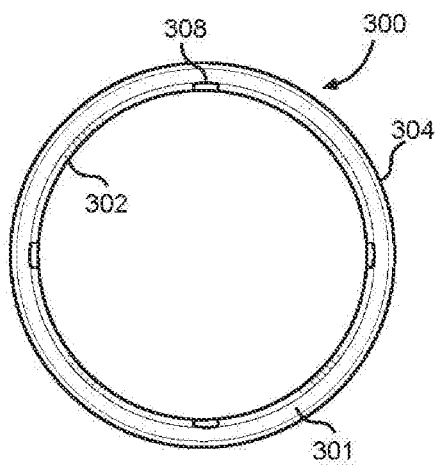
FIG. 10 illustrates a bottom view of the preferred embodiment of the direct drum bushing.
Figure 11:
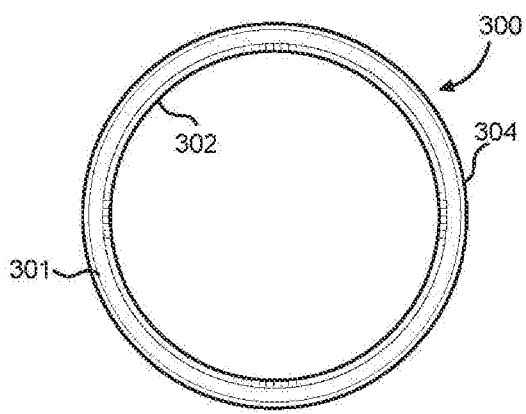
FIG. 11 illustrates a top view of the preferred embodiment of the direct drum bushing.

FIGS. 10 and 11 provide a bottom and top view, respectively, of the preferred embodiment of the bushing 300.

Figure 12:
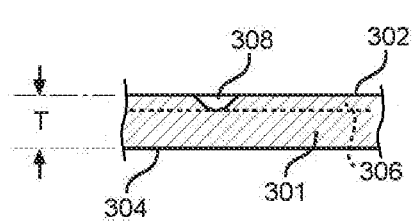
FIG. 12 illustrates a bottom view of a section of the preferred embodiment of the direct drum bushing wherein two channels intersect perpendicularly.

From the bottom view of FIG. 10, each of the four vertical channels 308 are seen evenly spaced 90 degrees apart along the inner surface 302 of the sleeve 301. Each vertical channel 308 has an open end 310 along the bottom edge 318 and closed end 314 near the top edge 316, such that the vertical channels are obscured in the top view of FIG. 11. In the preferred embodiment, each vertical channel 308 is 0.060 in or 1.524 mm wide and terminates at the closed end 314 between 0.090-0.100 in or 2.286-2.540 mm from the top edge 316 of the sleeve 301. The width of each vertical channel 308 is variable, with the width of each vertical channel being smaller than the width of the central channel 306. Further, the width of each vertical channel 308 may taper slightly into the thickness T of the sleeve, or moving from the inner surface 302 to the outer surface 304. FIG. 12 provides an enlarged top-down sectional view of one vertical channel 308 from FIG. 10. The sleeve 301 has a thickness T between 0.0622-0.0628 in or 1.580-1.591 mm, providing a range of vertical channel 308 depths between 0.0142-0.0198 in or 0.361-0.503 mm, inclusive.

While the preferred embodiment of the invention provides four evenly spaced vertical channels 308, other embodiments of the invention may include two, three, or more than four evenly spaced channels with dimensions similar to the preferred embodiment. However, four evenly spaced channels are preferred to best distribute lubricant.

Figure 13:
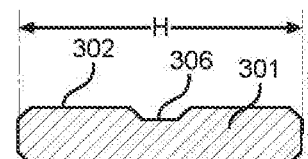
FIG. 13 illustrates a cross-sectional view of the preferred embodiment of the direct drum bushing.

FIG. 13 illustrates a cross-sectional view of the sleeve 301, which provides a view of the dimensions of the central channel 306. In the preferred embodiment 300, the central channel 306 is 0.187 in or 4.750 mm wide. Width of the central channel 306 may vary, with the width of the central channel being greater than the individual width of each vertical channel 308. Further the width of the vertical channel 308 may taper slightly, moving from the inner surface towards the outer surface. The depth of the central channel 306 ranges similarly to the depth of each vertical channel 308, with a depth between 0.0142-0.020 in or 0.361-0.503 mm, inclusive. The depth of each vertical channel 308 and the central channel 306 are the same wherever they fall within the stated range in a given embodiment to prevent pooling of lubricant within either the central channel or vertical channels due to differences in depth.

Figure 14:
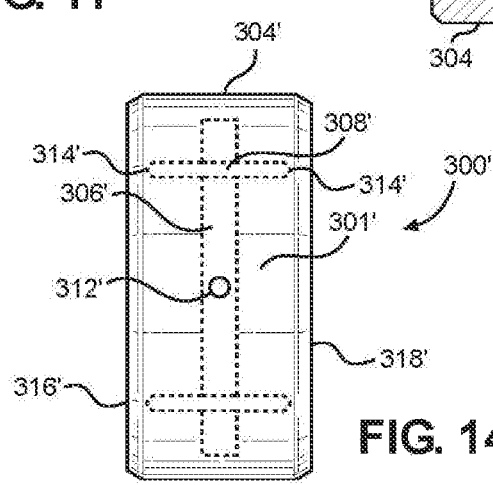
FIG. 14 illustrates a side view of an alternative embodiment of the preferred invention.

With reference to FIG. 14, an alternate embodiment of the bushing 300' is shown with vertical channels 308' having a pair of closed ends 314' oppositely oriented along each vertical channel, replacing the view of the preferred embodiment shown in FIG. 9. Beyond having two closed ends 314', all elements, dimensions, and variables regarding the preferred embodiment also apply to the embodiment of FIG. 14. The view of FIG. 11 would depict both the top and the bottom view, replacing FIG. 10.

In operation, all embodiments of the present invention restrict exhaust at the lube transfer ports 108 and exhaust/vent ports 106 to equalize bushing lube PSI or kPa with lube supply PSI or kPa. A hole or pair of holes 312 in the bushing with an area equal to that of the lube supply holes 109 in the center support 100 regulates an intermediate pressure to the bushings of 50% of the supply pressure on its own, regardless of the balance piston. When the balance piston is filled, the added resistance at the transfer orifices will begin to equalize bushing lube PSI or kPa with lube supply PSI or kPa. When the balance piston exhaust/vent ports 106 are also restricted, as with an increased height (H) of the bushing and installation site, equalization is insured and bushing lube PSI or kPa becomes that of the supply PSI or kPa. The central channel 306 and vertical channels 308 on the inner surface 302 direct pressurized lubricant evenly across the entire inner surface of the bushing 300, while the central channel further allows lubricant to flow from a center support supply hole 109 to the drum transfer port.

The sleeves 300 and 300', and further embodiments, may be made from industry standard materials typically used for drum bushings, such as metal and metal alloys.

I claim:

1. A bushing for use in a direct clutch drum of an automotive transmission, comprising:
    a cylindrical sleeve having an outer surface and an inner surface, wherein the cylindrical sleeve is operably positionable between an outer surface of a lube supply of a center support and an inner surface of a direct clutch drum cylinder;
    a central channel extending circumferentially along the inner surface of the cylindrical sleeve;
    a lube transfer port located along the central channel and bisecting the cylindrical sleeve; and
    four vertical lube channels extending along the inner surface of the cylindrical sleeve, each of the four vertical lube channels passing perpendicularly through the central channel and positioned 90 degrees apart from two adjacent vertical lube channels along the inner surface,
    wherein an end of each of the four vertical lube channels does not extend to an edge of the inner surface of the cylindrical sleeve such that the end of each of the four vertical lube channels is closed; and
    wherein an opposite end of each of the four vertical lube channels does extend to an opposite edge of the inner surface of the cylindrical sleeve such that the opposite end of each of the four vertical lube channels is open.

2. The bushing of claim 1, wherein a diameter of the lube transfer port is between 1.575-4.750 mm.

3. The bushing of claim 1, further comprising a second lube transfer port located along the central channel and positioned 180 degrees from the lube transfer port.

4. The bushing of claim 3, wherein a diameter of the second lube transfer port is between 1.575-4.750 mm.

5. The bushing of claim 1, wherein a height of the cylindrical sleeve is greater than 33.02 mm.

6. The bushing of claim 1, wherein the bushing is positionable such that exhaust is restricted through balance piston exhaust ports in the direct clutch drum cylinder.

7. The bushing of claim 6, wherein the lube transfer port allows lubricant to pass between the lube supply of the center support and the direct clutch drum cylinder.

8. A bushing, comprising:
    a cylindrical sleeve having an outer surface and an inner surface;
    a central channel extending circumferentially along the inner surface;
    a lube transfer port located along the central channel and bisecting the cylindrical sleeve; and
    at least one vertical lube channel extending along the inner surface, the at least one vertical lube channel passing perpendicularly through the central channel,
    wherein an end of the at least one vertical lube channel is closed; and
    wherein an opposite end of the at least one vertical lube channel is open.

9. The bushing of claim 8, wherein a diameter of the lube transfer port is between 1.575-4.750 mm.

10. The bushing of claim 8, further comprising a second lube transfer port located along the central channel and positioned 180 degrees from the lube transfer port.

11. The bushing of claim 10, wherein a diameter of the second lube transfer port is between 1.575-4.750 mm.

12. The bushing of claim 8, wherein a height of the cylindrical sleeve is greater than 33.02 mm.

13. The bushing of claim 8, wherein the cylindrical sleeve is positionable between a lube supply of a center support and a direct clutch drum cylinder.

14. The bushing of claim 13, wherein the bushing is positionable such that the cylindrical sleeve restricts exhaust through balance piston exhaust ports in the direct clutch drum cylinder.

15. The bushing of claim 14, wherein the lube transfer port allows lubricant to pass between the lube supply of the center support and the direct clutch drum cylinder.

16. The bushing claim 13, wherein, when positioned between the lube supply of the center support and the direct clutch drum cylinder, the bushing restricts exhaust at the lube transfer port to equalize fluid pressure between fluid entering and leaving the bushing.

* * * * *